(12) United States Patent
Kaule et al.

(10) Patent No.: US 6,294,241 B1
(45) Date of Patent: Sep. 25, 2001

(54) SECURITY DOCUMENT AND METHOD OF PRODUCING IT

(75) Inventors: Wittich Kaule, Emmering; Gregor Grauvogl, München, both of (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/074,388

(22) Filed: May 8, 1998

Related U.S. Application Data (62) Division of application No. 08/507,224, filed as application No. PCT/EP94/00417 on Feb. 14, 1994, now Pat. No. 5,820,971.

(30) Foreign Application Priority Data

Feb. 19, 1993 (DE) .................................................. 43 05 205
Nov. 11, 1993 (DE) .................................................. 43 38 595

(51) Int. Cl.[7] ................................................. B32B 3/24
(52) U.S. Cl. ...................... 428/138; 428/141; 428/156; 428/457; 428/913; 428/915; 428/916; 428/42.1; 428/41.8; 428/213; 283/86; 283/901; 283/902; 430/1; 430/2
(58) Field of Search ..................................... 428/141, 156, 428/138, 457, 913, 915, 916, 42.1, 41.8, 213; 283/86, 901, 902; 430/1, 2

(56) References Cited

U.S. PATENT DOCUMENTS

| | | | |
|---|---|---|---|
| 4,202,742 | * | 5/1980 | Castle ............................. 204/159.23 |
| 4,313,984 | | 2/1982 | Moraw et al. ......................... 428/13 |
| 4,442,197 | * | 4/1984 | Crivello et al. ...................... 430/280 |
| 4,657,779 | * | 4/1987 | Gaske .................................. 427/54.1 |
| 4,758,296 | | 7/1988 | McGrew et al. ..................... 156/231 |
| 4,788,102 | | 11/1988 | Koning et al. ......................... 428/40 |
| 4,880,662 | * | 11/1989 | Habrich et al. ..................... 427/54.1 |
| 4,892,385 | | 1/1990 | Webster et al. ........................ 283/91 |
| 5,003,915 | * | 4/1991 | D'Amato et al. ...................... 118/46 |
| 5,200,253 | | 4/1993 | Yamaguchi et al. ................. 428/195 |
| 5,248,544 | * | 9/1993 | Kaule ................................. 428/195 |
| 5,383,687 | | 1/1995 | Suess et al. ............................ 283/86 |
| 5,492,370 | | 2/1996 | Chatwin et al. ..................... 283/110 |

FOREIGN PATENT DOCUMENTS 2093404   9/1982 (GB) .

* cited by examiner

Primary Examiner—William P. Watkins, III
(74) Attorney, Agent, or Firm—Bacon & Thomas (57) ABSTRACT

A transfer foil for use in a safety document includes a multilayer structure having a carrier layer and a plastic layer in which diffraction structures, for example holographic structures, are embossed in the form of a relief structure and which is combined with a reflective layer. The plastic layer includes a reaction lacquer layer selected from the group consisting of cationical curing lacquers, blue light-curing lacquers and chemical curing multicomponent lacquers.

4 Claims, 8 Drawing Sheets

SECURITY DOCUMENT AND METHOD OF PRODUCING IT

This is a divisional of application Ser. No. 08/507,224, filed Oct. 27, 1995, which is a National Stage of PCT/EP94/00417, filed Feb. 14, 1994, which has issued as U.S. Pat. No. 5,820,971.

BACKGROUND OF THE INVENTION

1. Field of the Invention

A security document and method of producing it The present invention relates to security documents such as bank notes, identity cards or the like, with multilayer security elements having a layer in which diffraction structures, in particular holographic structures, are embossed in the form of a relief structure and which are combined with a reflective layer, and to a method for producing the same.

2. Discussion of Related Technology

Optically variable elements such as holograms, diffraction grids or interference layer elements have been preferably used for some time as protection against forgery or copying due to their optical properties that vary with the viewing angle. For mass production of such elements it is customary to produce so-called master holograms which have the particular phase information in the form of a three-dimensional relief structure. Starting with the master hologram one produces by duplication so-called press dies for embossing the required holograms in large numbers of units.

The embossing can also be done directly on the document material as described in EP-A 0 338 378. In a continuous process bank note paper in a roll form is first printed on both sides and then provided in certain areas with a holographic structure. The lacquer to be embossed and the relief structure are simultaneously transferred to the paper by covering the surface structure of the press die with a radiation-curable lacquer. As soon as paper and press die are brought in contact the lacquer is cured. The lacquer now adheres to the paper surface and has the holographic relief structure. Then the embossed structure is given a thin vacuum metalized layer that permits the holographic information to be observed in reflection.

Since paper is virtually impermeable to UV radiation the curing of the lacquer can in this case only take place with the aid of electron radiation, a very elaborate and expensive method that furthermore damages the paper. For this reason the production of embossed holograms directly on the document material has not become accented in practice, although this procedure has great advantages with respect to resistance to forgery since the hologram is connected virtually undetachably with the substrate. Due to the much more cost-effective production and more versatile applicability embossed holograms are therefore usually prepared as multilayer elements on a separate carrier and transferred to the document by means of an adhesive layer. The layer structure is dimensioned, or prepared by additional measures, in such a way that the hologram can be removed from the carrier layer after being glued to the document.

The multilayer element applied to the carrier material can be produced e.g. by the method known from U.S. Pat. No. 4,758,296. A matrix in web form wound on rolls is provided with a liquid resin and brought in contact with a plastic carrier material. The liquid resin is simultaneously cured by UV or electron radiation. In a further step the relief structure is provided with a thin metal layer so that the hologram can be observed in reflection. To be transferred to a document the layer structure is finally provided with a hot-melt adhesive layer that is activated under the action of heat and pressure.

However this security element has the disadvantage that the hologram element might be detached from the document by reheating the hot-melt adhesive, and transferred to another.

In general, so-called transfer embossing foils have more than the layers described in U.S. Pat. No. 4,758,296. For example EP-A 0 170 832 describes a transfer embossing foil comprising a carrier material, a first layer of lacquer permitting subsequent detachment of the carrier material, a second layer of lacquer in which the diffraction structures are embossed, a metal layer and a layer of bonding agent. Such a foil can be glued to a document by the method known from EP-A 0 433 575. The embossing foil in which the hologram structure is embedded is applied to a document locally in the form of a marking. For this purpose the document is printed at a certain place with an adhesive which only becomes viscous and sticky through UV, gamma or electron radiation. This activation takes place either before or after the transfer foil and document are brought together.

Although this security element offers irreversible adhesion to the document since the cured adhesive is not reactivable, the embossed structure can be exposed if the layer bordering the relief structure or the metal layer has a different chemical base.

BRIEF SUMMARY OF THE INVENTION

Interestingly enough, the prior art also contains proposals for preventing embossed layers from being exposed by using chemically homogeneous materials or permeable metal layers (GB-A 2 093 404). But since these elements are applied with reversibly activable adhesives in all such proposals these elements are still detachable from the substrate and thus insufficiently protected from manipulation. The invention is therefore based on the problem of providing a security document with an embossed hologram, whereby the embossed hologram has a simple layer structure with a good laminar compound that is cost-effective and simple to produce, and the hologram is furthermore connected with the document irreversibly.

The invention offers many-sided advantages involving both the production of embossed holograms directly on the document material and the production and application of transferred embossed holograms.

For example it is possible to produce embossed holograms directly on the antifalsification Caper with the aid of light-curing substances in very uncomplicated fashion. Such substances are e.g. blue light-curing or delayed-curing lacquers.

These substances can of course be used just as advantageously for producing or applying transferred embossed holograms.

Along with this simple production or transfer, the inventive security documents also offer the crucial advantage that the security elements have a simple layer structure and an intensive laminar compound within the element or between element and document.

This is because the materials selected for plastic layers that are adjacent in the element layer structure are chemically homogeneous and therefore ensure a much more intensive compound in the boundary layers than chemically different substances. The firm compound with the document arises from the use of reaction lacquers or adhesives (i.e., lacquers and adhesives that polymerize or cross-link upon physical and/or chemical activation) which adhere irreversibly to the document.

To obtain a layer structure as simple as possible even in the case of the transferred embossed holograms, the metal layer disposed above the embossed layer is not covered with an additional foil layer which is then equipped with an adhesive layer but, according to the invention, is coated directly with the adhesive, the adhesive being selected so as to have a foil-like character in the cured state (on the substrate). These requirements are met by all reaction adhesives that polymerize by physical and/or chemical activation. To counteract manipulation of all kinds the embossed layer of the transfer element and the adhesive layer are formed according to the invention as chemically homogeneous layers. The metal layer located between these layers is designed so thin that it already has microcracks or pores with normal handling so that the embossed layer and adhesive layer are in contact through these randomly present openings and form a largely inseparable compound at these places. Exposure of the relief structure cr detachment of the security element therefore leads inevitably to destruction of the stated layer structure. Alternatively or additionally the metal layer can also be provided with openings systematically.

In a preferred embodiment the transfer element comprises a carrier material preferably bearing a UV-curable layer of lacquer in which the hologram structure is embossed, and a metal layer whose thickness is much smaller than 1 micron, preferably in the range of 0.01 microns. Transfer to the document takes place by means of a UV-activable adhesive having a chemical composition similar to that of the UV-curable lacquer, whereby the adhesive and layer of lacquer are in direct contact with each other in some areas. This security element has a simple layer structure in which the layers themselves adhere in optimal fashion.

Depending on the case of application the inventive layer structure can be varied. The above-described transfer structure is particularly useful when extremely thin security elements are required that add as little buildup as possible on the later substrate or paper of value and also have low inherent stability after the carrier foil is removed, thereby additionally preventing removal of the security element.

If the security element is to be mechanically stable itself the invention offers two alternatives, namely to use a mechanically stressable foil in which the relief structure is embossed, or a carrier foil remaining on the later security element together with the embossed layer of lacquer or a foil layer bearing the embossing. Such a structure is to be equipped according to the invention with a permeable metal layer and with a curing adhesive layer. Such embodiments are of special interest in particular when the security element is designed as a strip and applied to the paper as a safeguarding thread.

BRIEF DESCRIPTION OF THE DRAWINGS

Further advantages and variants will be explained with reference to the figures. It is pointed cut that the figures do not offer a true-to-scale representation of the invention but are only for the sake of illustration. The term "reaction adhesive" or "reaction lacquer" used in the following text include all types of adhesives or lacquers that "cure" (i.e., polymerized or cross-link) irreversibly under specific physical or chemical action. Both UV-curable and two-component adhesives and lacquers are thus referred to here as reaction adhesives and reaction lacquers.

DETAILED DESCRIPTION OF PREFERRED EMBODIMENTS

Figure 1:
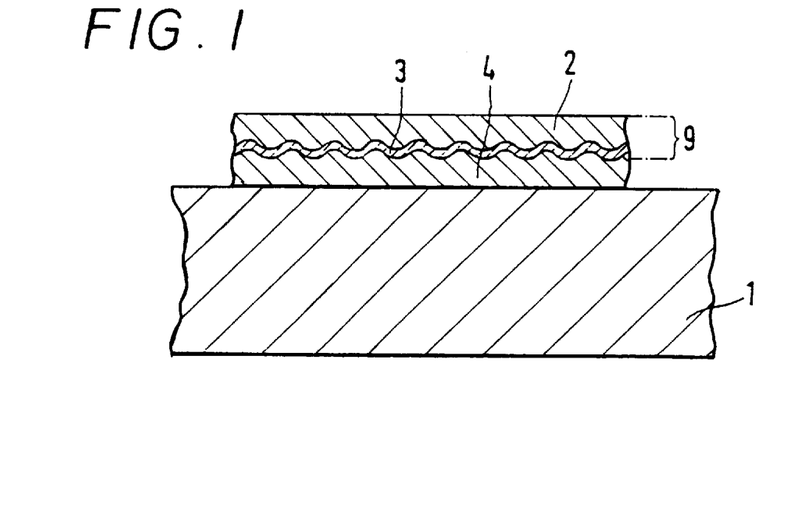
FIG. 1 shows an inventive security document.

FIG. 1 shows a cross section through a security document according to the invention. Security element 9 is disposed on security document 1 in a predetermined area. Depending on the requirements, element 9 can have the form of a thread or band or be formed as a mark with certain contour shapes. It comprises UV-curable or chemically curable layer of reaction lacquer 2 in which diffraction structures are embossed in the form of a relief, and thin reflective layer 3, preferably a metal layer. Element 9 is inseparably connected with security document 1 via reaction adhesive layer 4. Adhesive layer 4 consists of a material that is largely homogeneous chemically with the material of embossed layer 2. This has the advantage that a very firm compound arises in areas where the metal layer contains pores or microcracks (which is unavoidable with layer thicknesses in the range of about 1 micron) and where layer of lacquer 2 and adhesive layer 4 thus adjoin directly. This is very desirable with respect to protection against forgery by reembossing the relief structure, and resistance wear. Since UV-curable or chemically curable layers of reaction lacquer and adhesive are irreversibly curable it is impossible to detach the layers later. In case of thermal or chemical attacks both layers are furthermore always affected so that such measures necessarily destroy the total security element.

Figure 2:
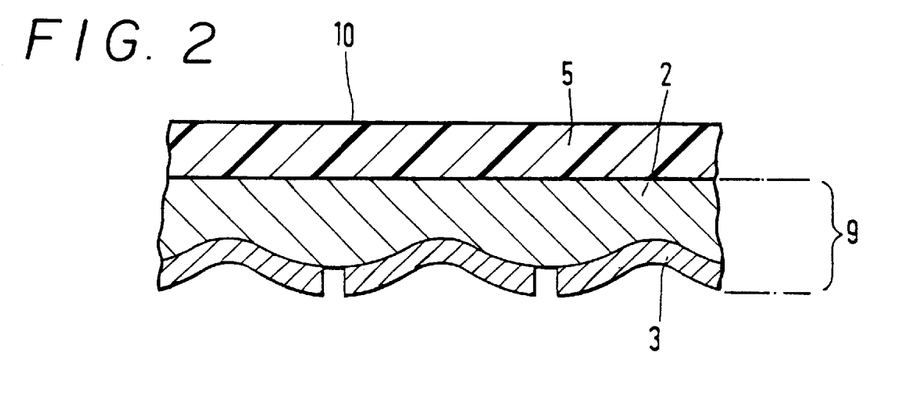
FIG. 2 shows a transfer embossing foil according to the invention.

In this embodiment of the invention security element 9 is produced separately as transfer embossing foil 10 whose structure is shown in FIG. 2. Carrier material 5 is expediently designed as an endless plastic band to which lacquer 2 is applied in a continuous process. A matrix whose surface structure corresponds to the interference stripe pattern of any desired diffraction structure is used to emboss the relief structure in reaction lacquer 2, which is cured e.g. by UV radiation during the embossing process. Such a method is described for example in the abovementioned U.S. Pat. No. 4,758,296.

Alternatively one can of course also use a delayed-curing lacquer, i.e. a lacquer in which polymerization is initiated by irradiation with suitable light and then takes place with a time lag, or a blue light-curing lacquer. More detailed information about such lacquers can be found elsewhere.

After this the embossed structure in layer 2 is provided with an either uninterrupted or screened reflective layer 3, preferably a metal layer. Screening offers the advantage that the compound between adhesive layer 4 and embossed layer 2 can be made even firmer. The size of the metal-free areas can be selected as one chooses; it is thus conceivable to make the metal-free areas so small that they cannot be resolved by the eye and thus do not impair the general impression of the information shown. Alternatively the metal-free areas could be used as design elements so that the diffraction information is observable visually within the security element area only at certain places.

Metalizing methods to be used may be e.g. the customary vacuum metalizing method or else a photolytic method.

The metalized layer can optionally be provided with a protective layer, in which case the latter should be made of a material chemically homogeneous with embossed layer 2.

The finished transfer embossing band 10 can be stored on rolls as a semifinished product and used on demand in a production method as described in the following with reference to FIGS. 3 to 5.

Figure 3:
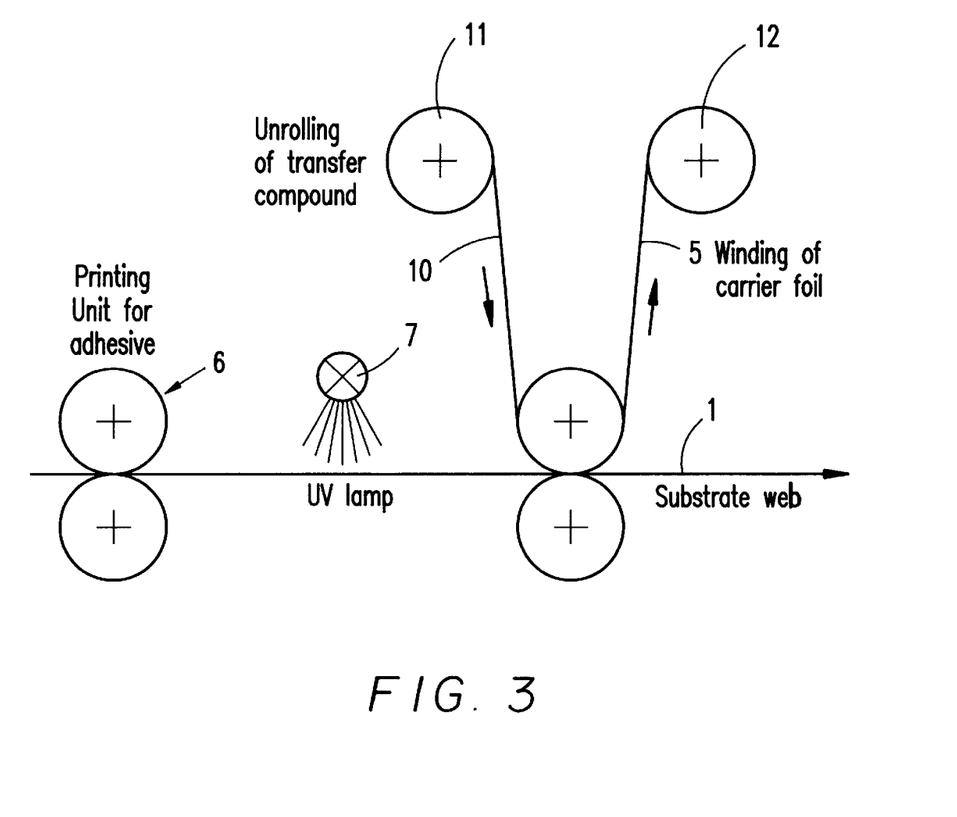
FIG. 3 shows a method for producing the inventive security document of FIG. 1.

FIG. 3 shows part of a continuous method for producing security documents according to the invention. Security document material 1, preferably bank note paper already printed, exists here in web form and is coated locally with a special reaction adhesive in printing unit 6.

This reaction adhesive is for example a cationically reacting UV adhesive that can be treated like an ink before activation. Unlike customary radically reacting UV adhesives which only cure during irradiation, so-called cationically curing adhesives have the property of being only activated by irradiation with UV light and curing further after irradiation. Such cationically curing UV lacquer systems are sold e.g. by Herberts under type designation ISS 1202.

After adhesive 4 has been transferred to substrate 1 in printing unit 6 it is irradiated in the next unit with UV lamp 7, as shown in FIG. 3, to activate its bonding ability. In the following step transfer embossing foil 10 with elements 9 is fed from supply roll 11 according to FIG. 2. Element 9 (FIG. 2) adheres to the adhesive layer and is removed from carrier band 5 in the form of the reaction adhesive coating. Carrier band 5 and the non-transferred remains of element layer structure 9 are wound onto transfer band roll 12. In a last method step not shown, substrate 1 provided with security elements 9 is cut up into suitable formats, e.g. individual bank notes.

In a variant, adhesive 4 can also be printed on transfer embossing foil 10 and activated there. This possibility is shown in FIG. 4. Before embossing foil 10 removed from roll 11 is brought together with substrate 1, UV-activatable adhesive 4 is applied to metal layer 3 of embossing foil 10 in any desired patterning in printing unit 6 and then activated with UV lamp 7. In this case too carrier band 5 is removed from substrate 1 via roll 12 directly after foil 10 and element 9 join substrate 1.

Instead of delayed-curing (cationically cured) adhesives one can of course also use the abovementioned blue light-curing reaction adhesives. This method variant is shown in FIG. 5. Paper web 1 is provided with the blue light-curing reaction adhesive in printing unit 6. This reaction adhesive is e.g. an acrylate from Imperial Chemical Industries PCL with the designation LCR 0603B.

In the area of pressing cylinder 16 transfer material 10 and paper web 1 are brought in contact and irradiated with blue light 17. The reaction adhesive thereby cures within seconds since the paper is permeable to blue light. The transfer foil can then be removed from the hologram-paper compound in the usual way.

Figure 4:
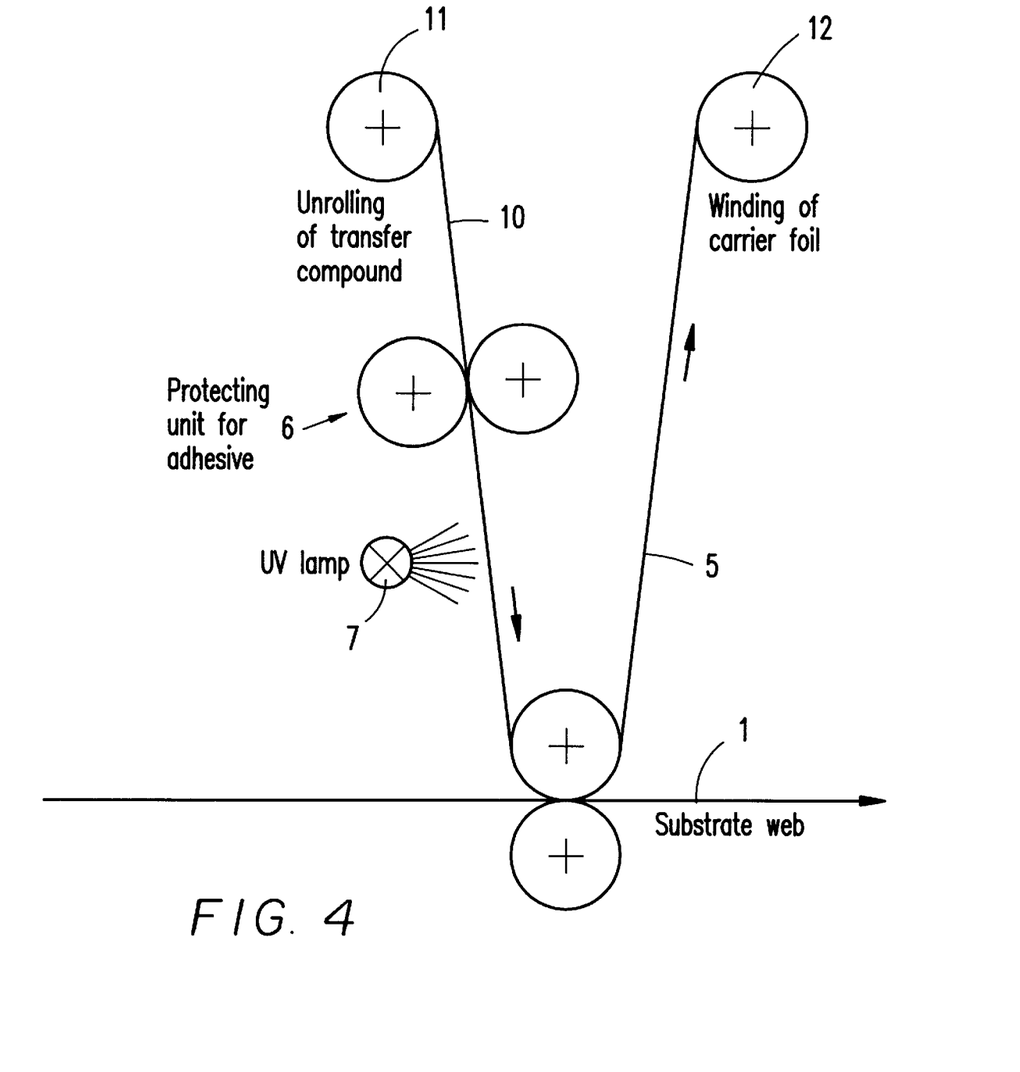
FIG. 4 shows a variant of the production method of FIG. 3.
Figure 5:
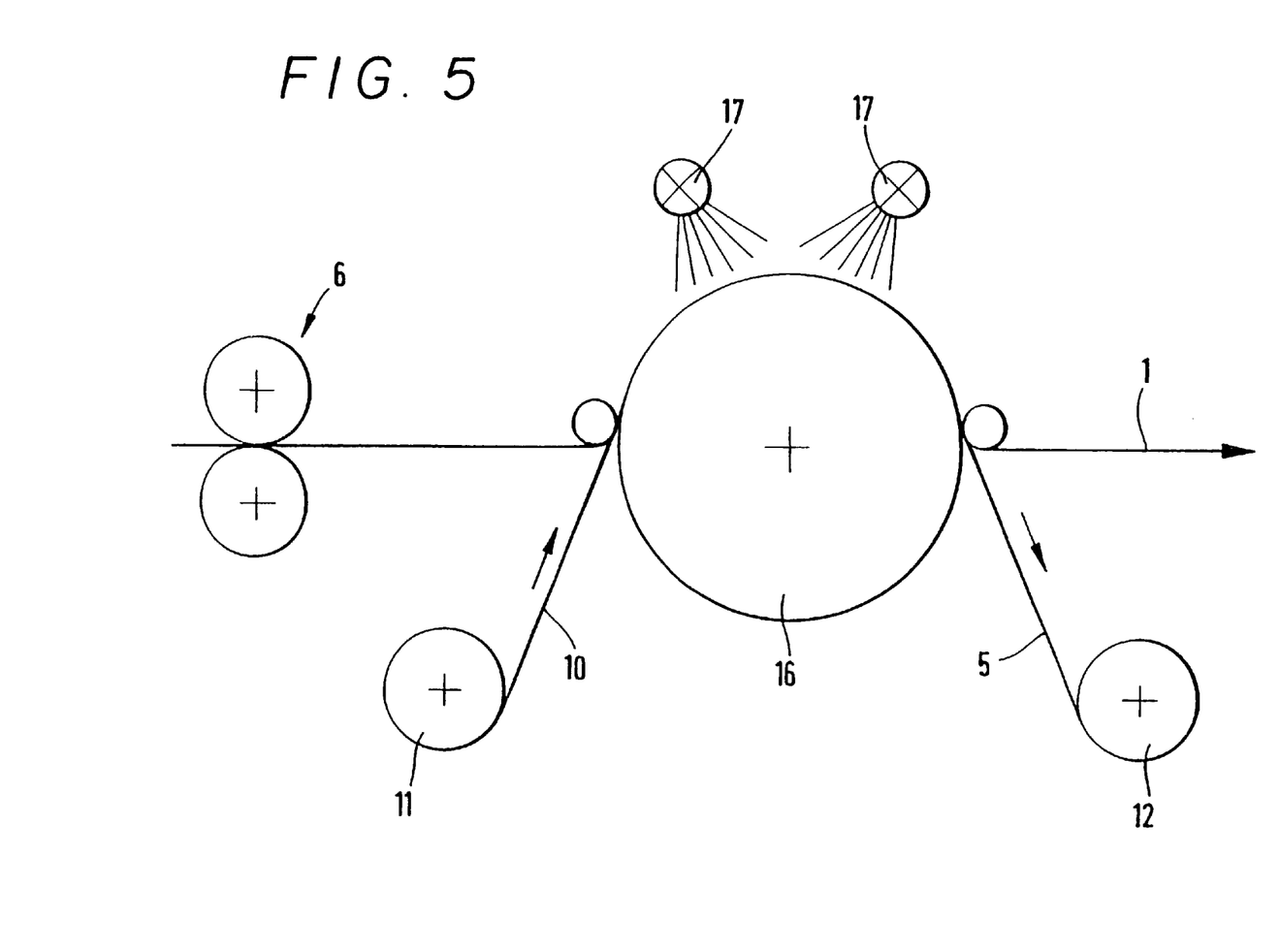
FIG. 5 shows a variant of the production method of FIG. 3.

Departing from the embodiments shown in FIGS. 3 to 5 it is also possible to leave carrier foil 5 on substrate 1 temporarily or permanently. This may be useful as additional protection from mechanical loads temporarily, e.g. for a period of storage or transport, or for the entire life e.g. of safeguarding threads. It is important in this connection that the protective layer function performed by carrier foil 5 should in this case be regarded only as additional to the protective layer function of layer of reaction lacquer 2. Removal of carrier foil 5 opens up no possibilities of manipulation since it does not yet make the relief structure accessible.

The methods shown in FIGS. 3 to 5 are wonderfully simple and require no elaborate protective measures, as are necessary for example when electron-beam curing or solvent-containing adhesives are used. Furthermore one thus obtains both a firm laminar compound within the security element and firm adhesion to the document, so that it is not possible either to separate the embossed structure from the element layer structure or to detach the element from the document.

Although it is preferable to use radiation-curing reaction adhesives for reasons of process engineering, in particular due to their simple and extremely fast curing, one can alternatively use mixed reaction adhesives which are related chemically with the embossed layer. According to the invention the embossed layer need not necessarily be a radiation-curable layer of lacquer, it can also be a chemically curing layer that has the same chemical base as the adhesive layer.

Figure 6:
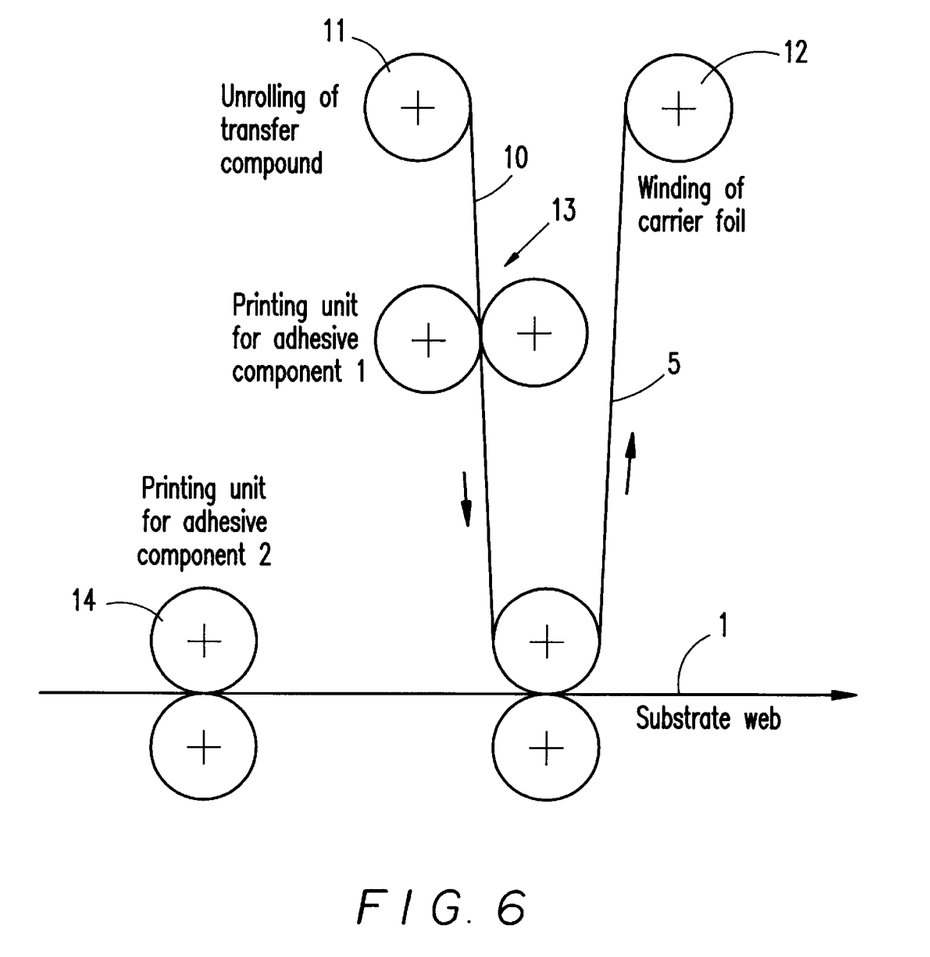
FIG. 6 shows a further variant of the production method of FIG. 3.

This variant is shown in FIG. 6. One component of the reaction adhesive is applied in printing unit 13 directly to transfer embossing foil 10 removed from roll 11, while the second component is applied in printing unit 14 to substrate 1. When substrate 1 and transfer embossing foil 10 are brought together a self-curing layer arises in the area of the adhesive components to ensure the compound between substrate 1 and embossed layer 2. Carrier material 5 can of course here too be removed directly after joining substrate 1, as shown in the figure, or else be left on substrate 1 as a temporary protective layer.

The separate application of the adhesive components shown in FIG. 6 makes the functional principle particularly clear. However this procedure is not permissible with any two-component adhesive since these adhesives generally develop their adhesive properties only when intimately mixed. Departing from the principle shown in FIG. 6 one can, if necessary, replace pair of rolls 13 or 14 by a mixing apparatus (not shown) for first mixing the two components and then applying them jointly in the way customary for the expert. The other pair of rolls is then omitted in this embodiment.

Figure 7:
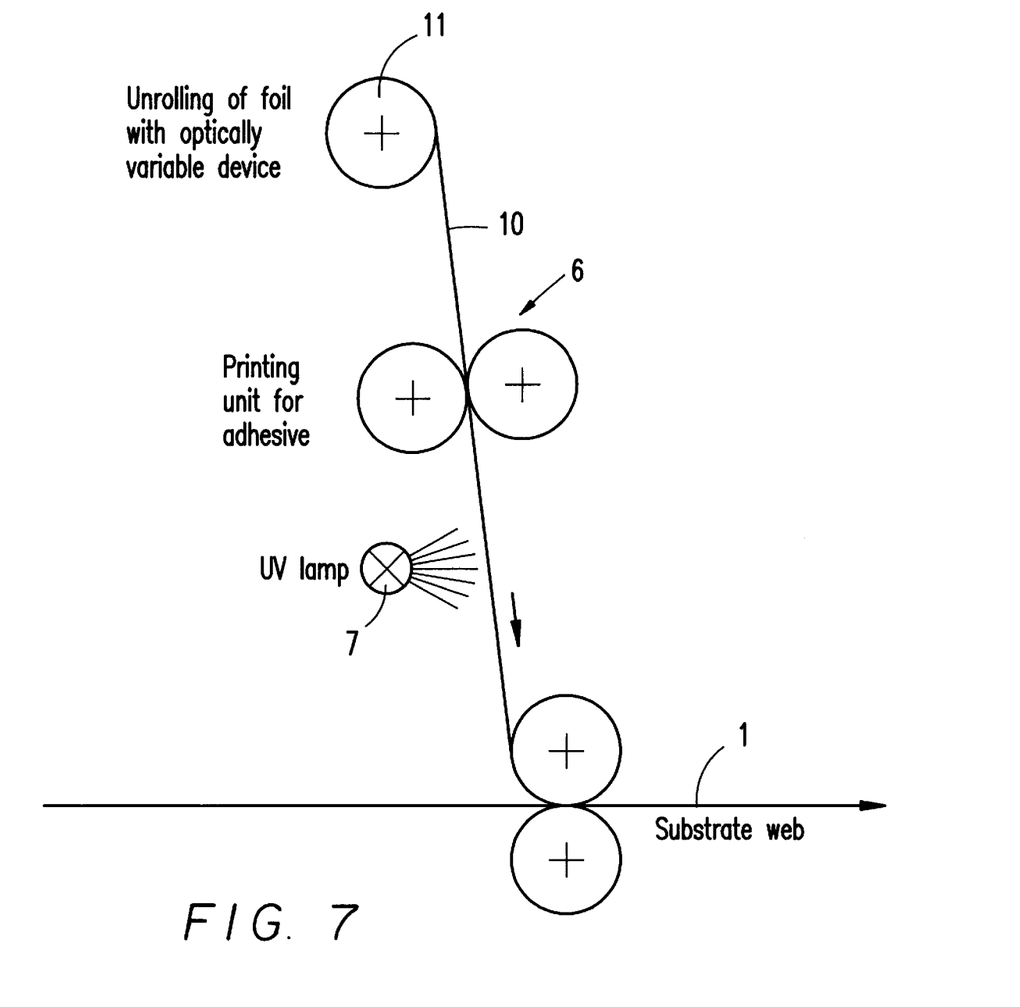
FIG. 7 shows a further variant of the production method of FIG. 3.

FIG. 7 shows a further possibility for producing the inventive security element. This method corresponds substantially to the production method of FIG. 4 only that security element carrier 10 supplied by roll 11 is completely fixed to substrate 1 here, i.e. no transfer band is removed. As already mentioned at the outset such an embodiment is useful in cases where the security elements have sufficient inherent stability (stable relief foil), or one desires increased protection from mechanical loads by providing an additional protective layer (additional protective layer instead of transfer carrier foil).

Figure 8:
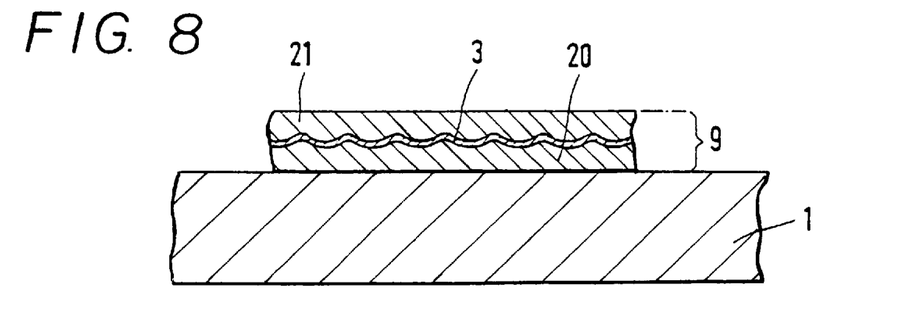
FIG. 8 shows a variant of the inventive security document.

FIG. 8 shows a variant of reaction inventive security document 1. In this case security element 9 comprises layer of lacquer 20 in which the diffraction structures are embossed in the form of a relief, thin reflective layer 3, preferably a metal layer, and layer of protective lacquer 21. Here too element 9 can have the form of a thread or band or else be formed as a mark with certain contour shapes, depending on the requirements. Embossed layer of lacquer 20 consists according to the invention of a reaction lacquer, in particular a UV-initiated delayed-curing or a blue light-curing lacquer, as were already explained. Layer of protective lacquer 21 protects the sensitive embossed structure and metal layer 3 from outside environmental influences and mechanical impairment. It is preferably made of a material chemically homogeneous with layer of reaction lacquer 20 to form a firm compound with layer of lacquer 20 in the area of microcracks or pores in the metal layer.

In contrast to the security document shown in FIG. 1 security element 9 is produced directly on the document in this embodiment. The various procedures permitting simple and cost-effective production of this security document will be explained in more detail with reference to FIGS. 9 and 10.

Figure 9:
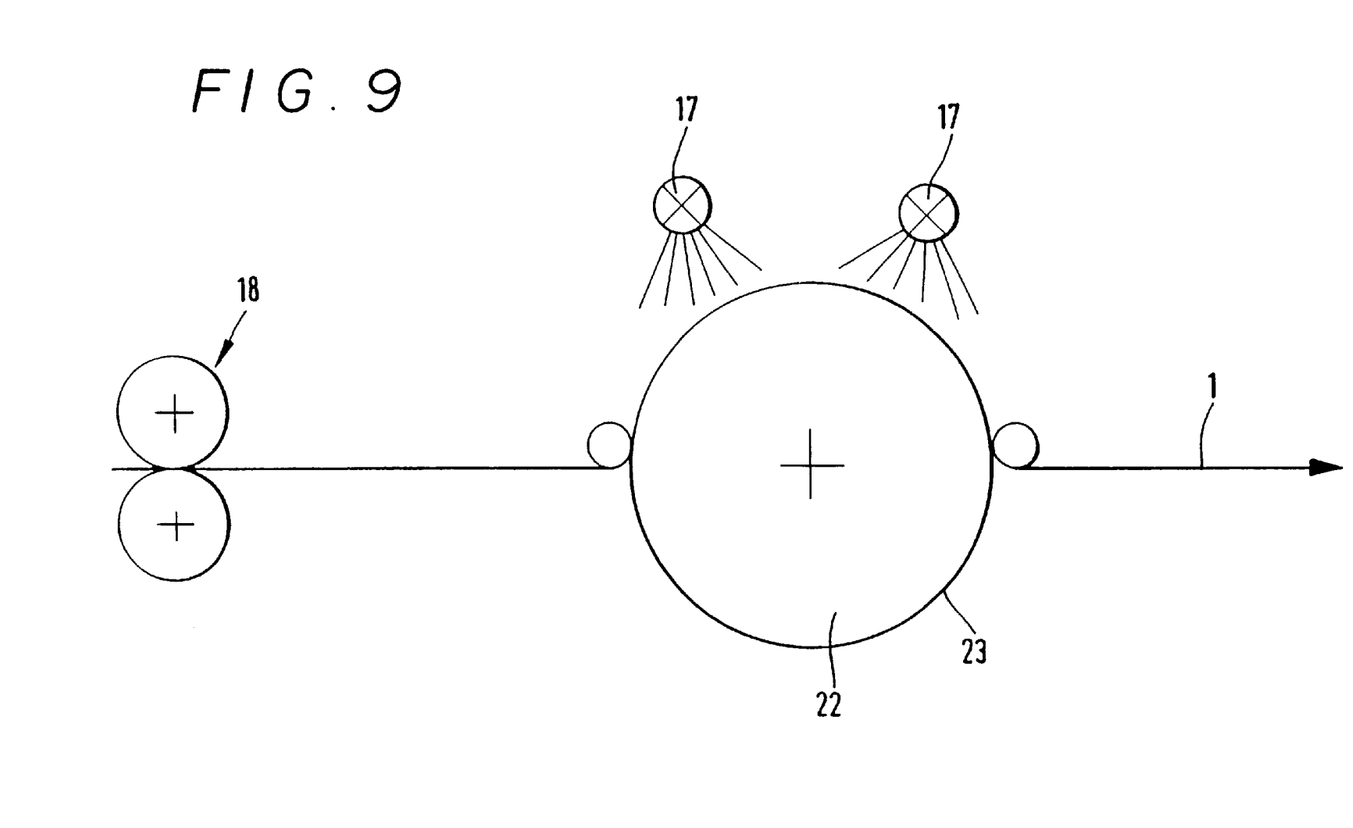
FIG. 9 shows a method for producing the inventive security document of FIG. 8.

In FIG. 9 a blue light-curing reaction adhesive, e.g. the abovementioned acrylate LCR-0603B, is applied by means of printing unit 18 to paper substrate 1 in the desired form of later security element 9, possibly all over. The pretreated paper is then fed to an embossing unit, here embossing cylinder 22. The surface of the embossing cylinder has holographic relief structure 23 which is transferred upon contact with the layer of reaction lacquer. During the embossing process the reaction lacquer is cured within seconds through the paper layer with the aid of blue light 17. In following method steps not shown in the figure the metalizing or protective lacquer coating is performed.

Alternatively the embossing roll can be provided with the reaction lacquer instead of paper web 1. After irradiation with blue light the cured embossed layer adheres to the paper and is removed from the embossing roll.

Figure 10:
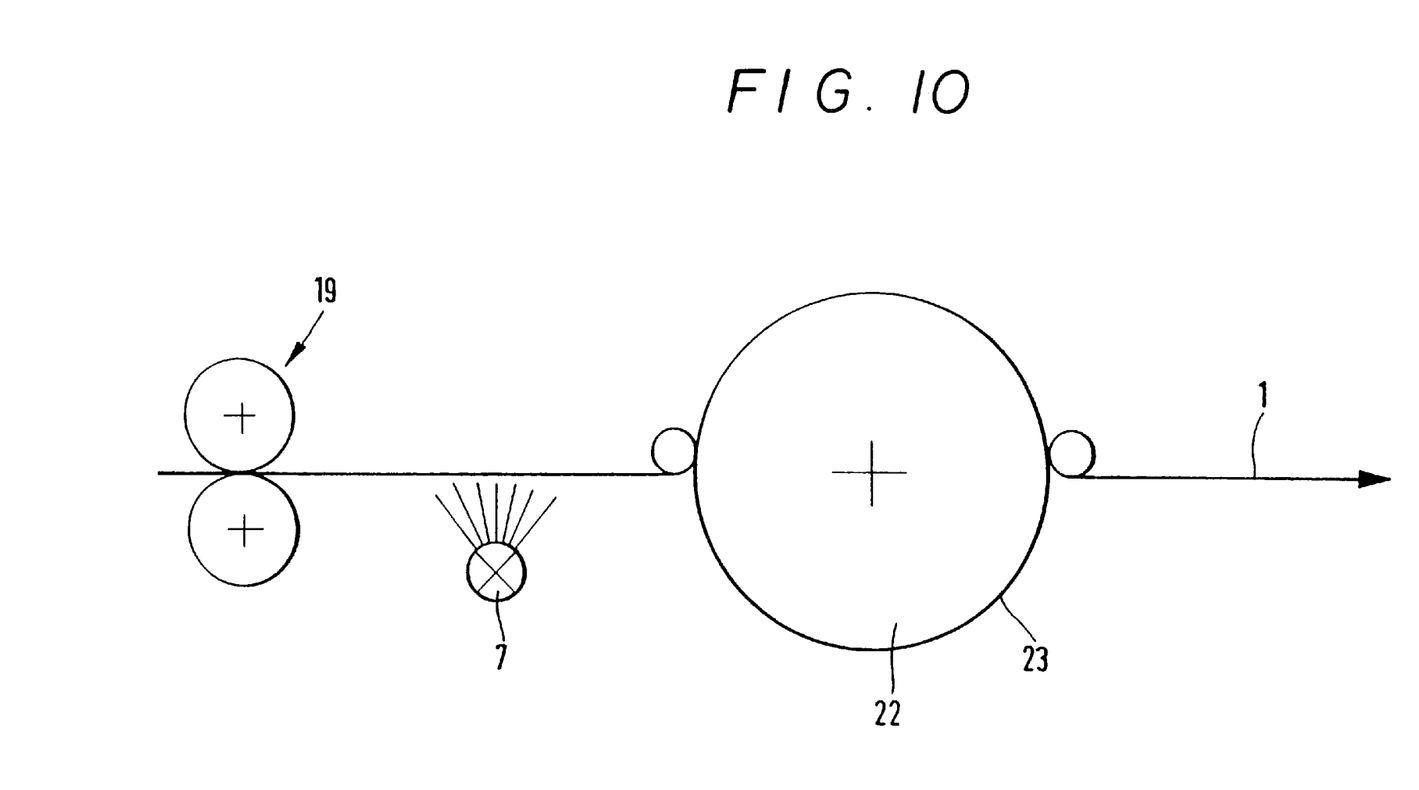
FIG. 10 shows a variant of the production method of FIG. 9.

FIG. 10 shows a similar method in which a delayed-curing (cationically cured) reaction lacquer is used for the layer to be embossed. In this case the layer of reaction lacquer applied to the paper is irradiated shortly before the embossing unit. The exposure to UV light only initiates polymerization reaction and does not cause complete curing of the reaction lacquer. The still formable layer of reaction lacquer is then provided with relief structure 23 by being brought in contact with embossing cylinder 22. When substrate web 1 leaves the embossing unit the layer of reaction lacquer is completely crosslinked and can be processed further in the conventional way.

It is of course also possible in this embodiment example to apply the delayed-curing reaction lacquer to the embossing roll, partially activate it there and finally bring it in contact with the paper during the final curing process.

The described methods thus permit simple production of a security element very resistant to forgery having a minimum of element layers and thus requiring very few method steps for its production, and can furthermore dispense with complicated, cost-intensive techniques.

A further method variant is to provide the embossing roll as shown in FIGS. 9 and 10 with a metalized layer before it is brought in contact with the layer of reaction lacquer. More details of this procedure can be found in EP-A 0 563 992.

Since particularly antifalsification papers frequently have great surface roughness which might impair the effectiveness of the diffraction structures the paper can, if necessary, be glazed in the area of the security element before lacquering by additional measures, as are described in EP-A 0 440 045.

It is also evident that any desired combinations of reaction adhesives lacquers can be used for the embossed layer and the adhesive layer in the case of the transferred embossed hologram. The same holds for the embossed or protective layer of the hologram produced directly on the document.

What is claimed is:

1. A transfer foil having a multilayer structure including a carrier layer and a plastic layer in which diffraction structures are embossed in the form of a relief structure and which is combined with a reflective layer, wherein the plastic layer comprises a reaction lacquer layer selected from the group consisting of cationical curing lacquers, blue light-curing lacquers and chemical curing multicomponent lacquers, and wherein the reflective layer includes openings which are pores or microcracks which are present systematically in a predetermined pattern to permit interaction of the embossed layer with a subsequently applied adhesive layer.

2. The transfer foil of claim 1, wherein the reflective layer has a thickness smaller than 1 $\mu$m.

3. The transfer foil of claim 2, wherein the thickness is about 0.01 $\mu$m.

4. The transfer foil of claim 1, wherein the reflective layer is a metal layer.

* * * * *